US012761475B2

(12) United States Patent
Murata et al.

(10) Patent No.: US 12,761,475 B2
(45) Date of Patent: Oct. 13, 2026

(54) DISPLAY DEVICE FOR VEHICLE

(71) Applicant: Yazaki Corporation, Tokyo (JP)

(72) Inventors: Naohisa Murata, Shizuoka (JP); Yuta Miyake, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 203 days.

(21) Appl. No.: 18/792,066

(22) Filed: Aug. 1, 2024

(65) Prior Publication Data

US 2024/0393587 A1 Nov. 28, 2024

Related U.S. Application Data

(63) Continuation of application No. PCT/JP2023/008496, filed on Mar. 7, 2023.

(30) Foreign Application Priority Data

Apr. 5, 2022 (JP) ................................ 2022-062826

(51) Int. Cl.
*G02B 27/01* (2006.01)
*B60K 35/23* (2024.01)

(52) U.S. Cl.
CPC .......... *G02B 27/0101* (2013.01); *B60K 35/23* (2024.01); *G02B 27/0149* (2013.01)

(58) Field of Classification Search
CPC G02B 27/0101; G02B 27/0149; B60K 35/23; B60K 35/00; G02F 1/13; G02F 1/133; G02F 1/1333; G02F 1/1336
USPC .......................................................... 359/630
See application file for complete search history.

(56) References Cited

U.S. PATENT DOCUMENTS

2009/0059145 A1* 3/2009 Nishioka ........... G02F 1/133707 349/119
2009/0244432 A1* 10/2009 Hattori ................. G02B 6/0088 362/617
2010/0296024 A1* 11/2010 Ishimaru .................. G02B 5/20 349/61
2014/0183503 A1* 7/2014 Kadoma ............ H10K 85/6572 546/77
2025/0035973 A1* 1/2025 Murata .................. B60K 35/23

FOREIGN PATENT DOCUMENTS

CN 105319721 A 2/2016
JP 05-289058 A 11/1993
JP 2005-313733 A 11/2005
(Continued)

OTHER PUBLICATIONS

Notification of Reason for Refusal issued on May 15, 2024 in Japanese Patent Application No. 2022-062826.

*Primary Examiner* — Mohammed A Hasan
(74) *Attorney, Agent, or Firm* — Sughrue Mion, PLLC

(57) ABSTRACT

A display device for a vehicle includes a housing, a liquid crystal display device, a transparent plate-shaped first heat conductive member that is arranged in contact with any of a display surface and a back surface of the liquid crystal display device, and a second heat conductive member that conducts heat between the first heat conductive member and the housing. The second heat conductive member is, for example, a Peltier element including a first surface and a second surface, and arranged to bring a first surface into contact with the first heat conductive member and bring a second surface into contact with the housing.

3 Claims, 13 Drawing Sheets

(56) References Cited

FOREIGN PATENT DOCUMENTS

| | | | | |
|---|---|---|---|---|
| JP | 2007-065011 | A | | 3/2007 |
| JP | 2008-089904 | A | | 4/2008 |
| JP | 2009-151249 | A | | 7/2009 |
| JP | 2010-079169 | A | | 4/2010 |
| JP | 2015-102750 | A | | 6/2015 |
| JP | 2016031457 | A | * | 3/2016 |
| JP | 2022130236 | A | * | 9/2022 |

* cited by examiner

DISPLAY DEVICE FOR VEHICLE

CROSS-REFERENCE TO RELATED APPLICATION(S)

This application is a continuation application of International Application No. PCT/JP2023/008496 filed on Mar. 7, 2023 which claims the benefit of priority from Japanese Patent Application No. 2022-062826 filed on Apr. 5, 2022 and designating the U.S., the entire contents of which are incorporated herein by reference.

BACKGROUND OF THE INVENTION

1. Field of the Invention

The present invention relates to a display device for a vehicle.

2. Description of the Related Art

In the related art, there is known a technique of preventing a display from being damaged for a display device for a vehicle. Japanese Patent Application Laid-open No. 2005-313733 discloses a display device for a vehicle including a heat transmission member that transmits a display image and is in contact with a polarizing member on an emitting side, and a holding member that is made of metallic material and holds the heat transmission member on an optical path for the display image between a liquid crystal cell to a display member.

There is room for improvement in controlling a temperature of a display to be an appropriate temperature. There is a demand to appropriately control a temperature of a liquid crystal display device.

SUMMARY OF THE INVENTION

An object of the present invention is to provide a display device for a vehicle in which a temperature of a liquid crystal display device can be appropriately controlled.

In order to achieve the above mentioned object, a display device for a vehicle according to one aspect of the present invention includes: a first housing fixed to a vehicle body; a liquid crystal display device housed in the first housing; a backlight unit that is housed in the first housing, and irradiates a back surface of the liquid crystal display device with light; a transparent plate-shaped first heat conductive member that is arranged in contact with any of a display surface and the back surface of the liquid crystal display device; a second heat conductive member that conducts heat between the first heat conductive member and the first housing; and the backlight unit includes a second housing, a light source housed in the second housing, and a heat sink that radiates heat of the second housing and the light source, and the second heat conductive member is a Peltier element that is sandwiched between the first housing and the first heat conductive member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes a display device for a vehicle according to an embodiment of the present invention in detail with reference to the drawings. The present invention is not limited to the embodiment. Constituent elements in the following embodiment encompass a constituent element that is easily conceivable by those skilled in the art, or substantially the same constituent element.

EMBODIMENT

Figure 1:
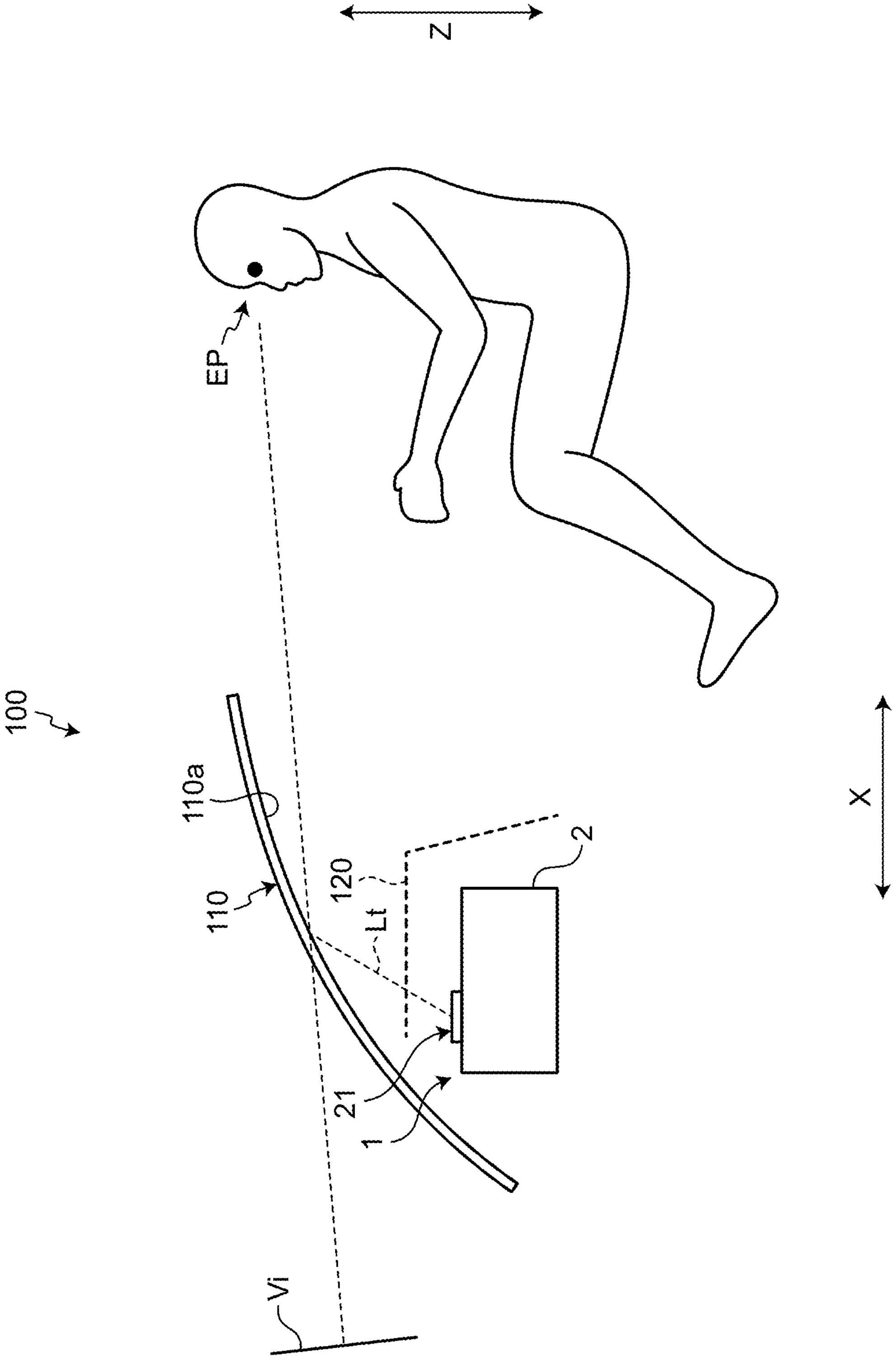
FIG. 1 is an arrangement diagram of a display device for a vehicle according to an embodiment.
Figure 2:
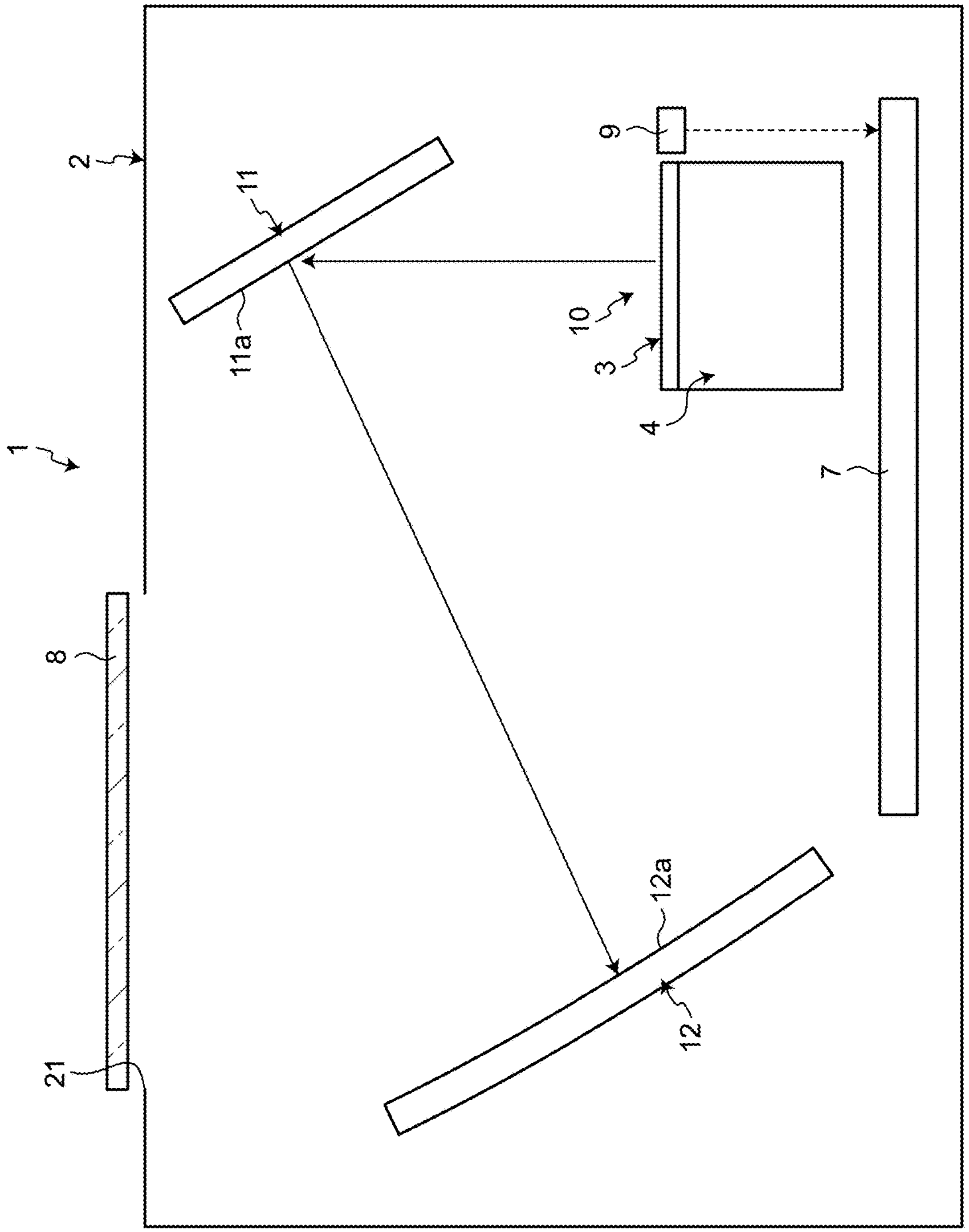
FIG. 2 is a schematic configuration diagram of the display device for a vehicle according to the embodiment.
Figure 3:
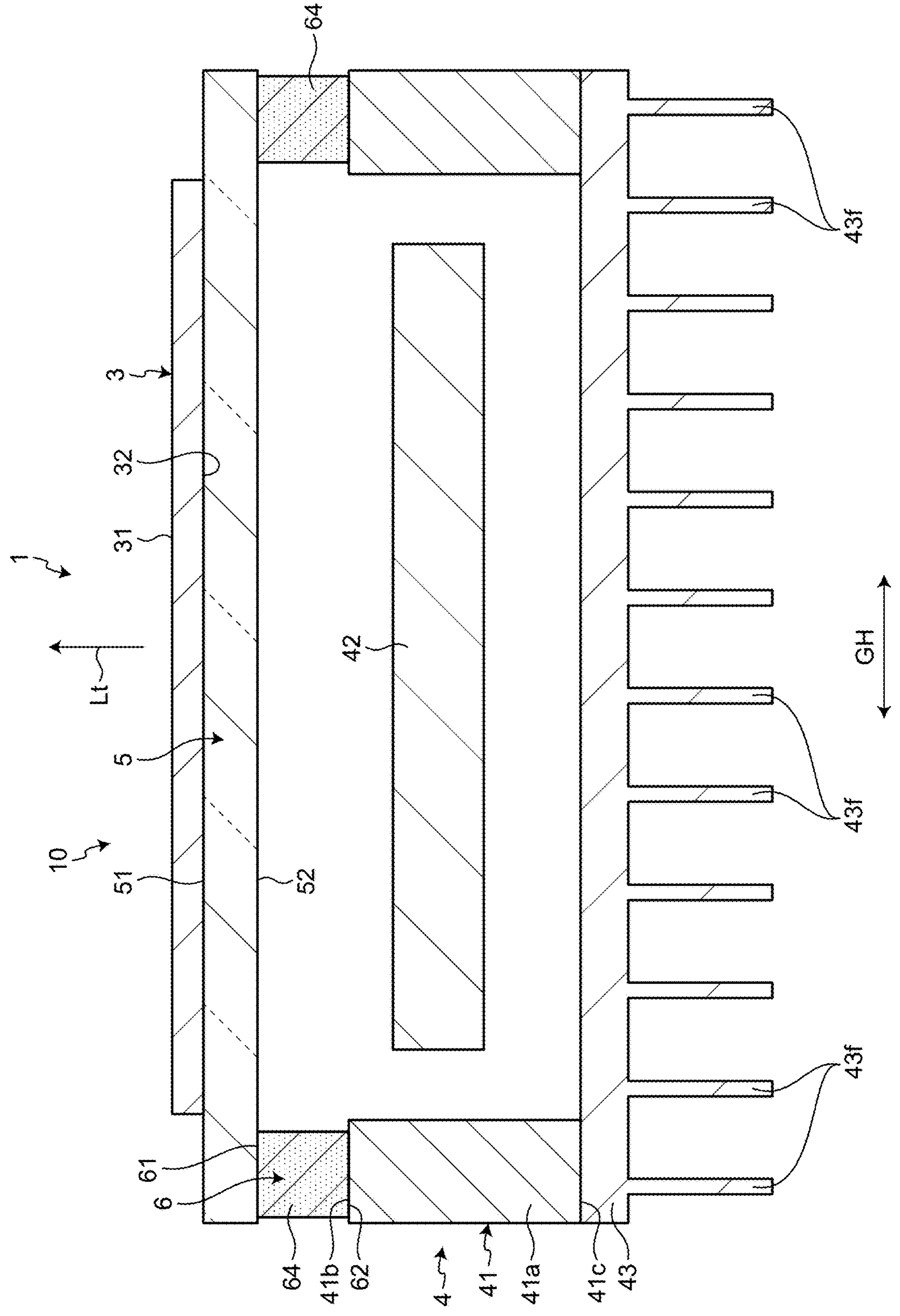
FIG. 3 is a cross-sectional view of an image display device according to the embodiment.
Figure 4:
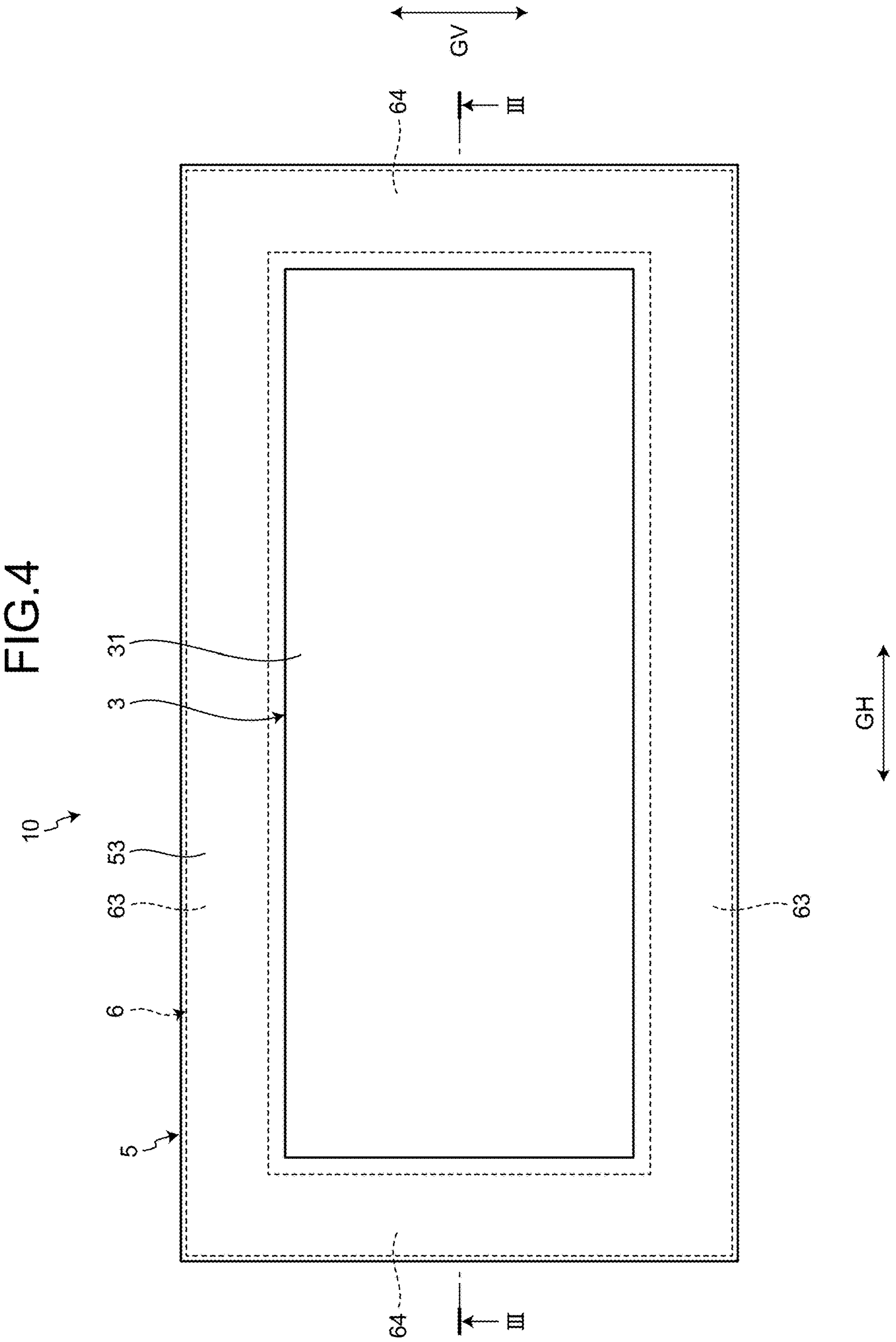
FIG. 4 is a plan view of the image display device according to the embodiment.
Figure 5:
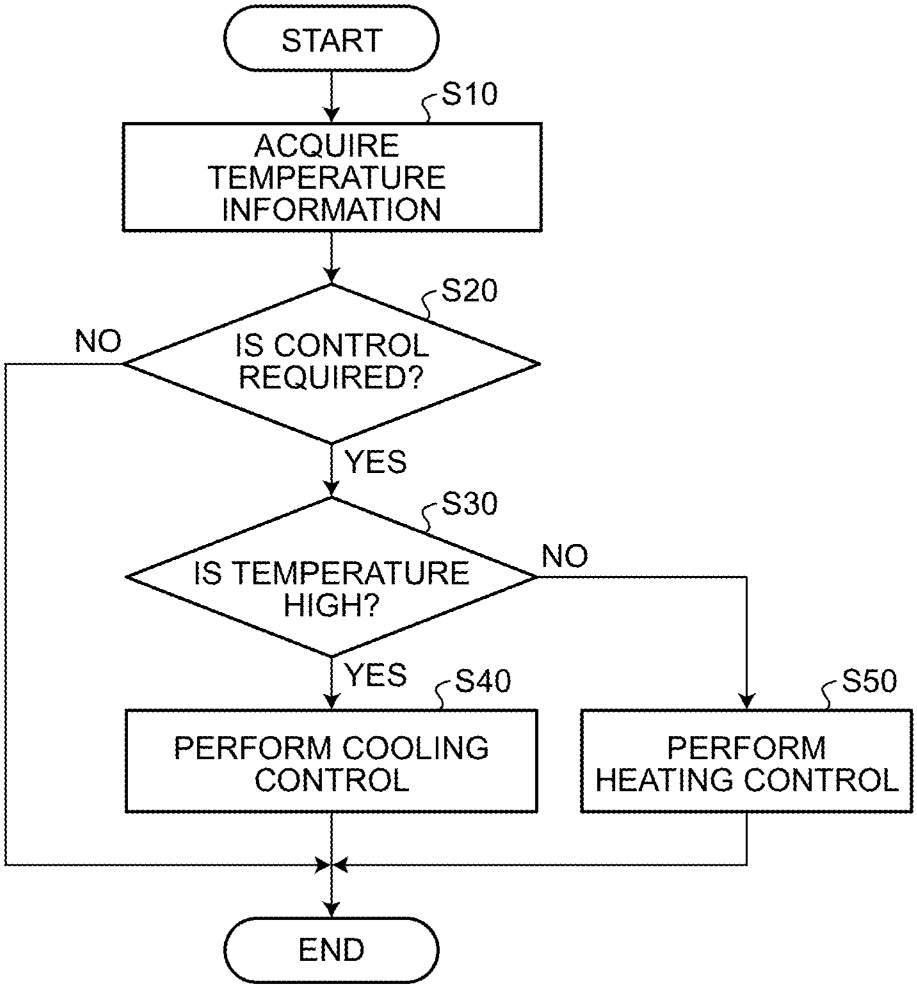
FIG. 5 is a flowchart for explaining an operation of a control unit according to the embodiment.
Figure 6:
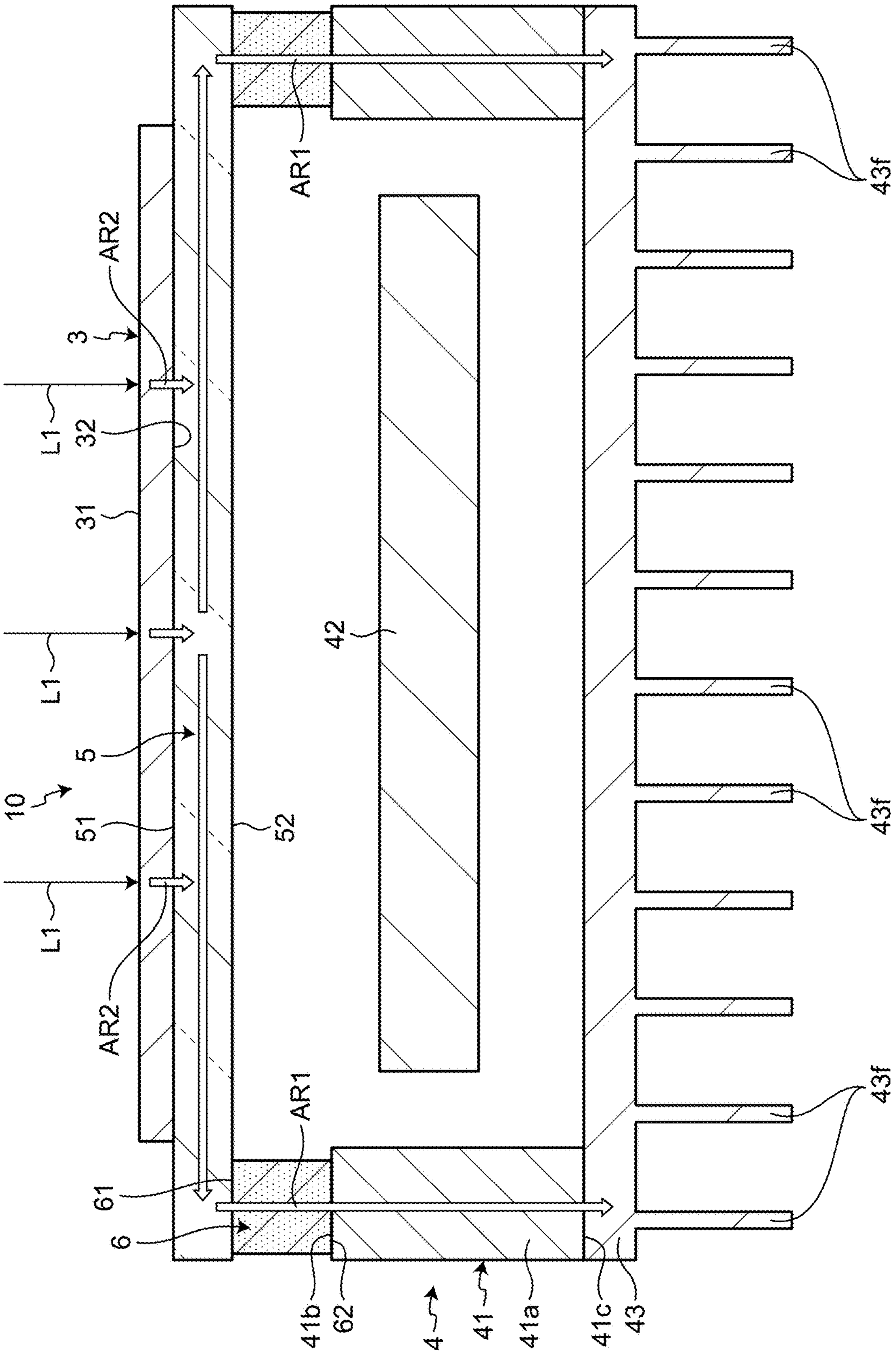
FIG. 6 is a cross-sectional view for explaining cooling control according to the embodiment.
Figure 7:
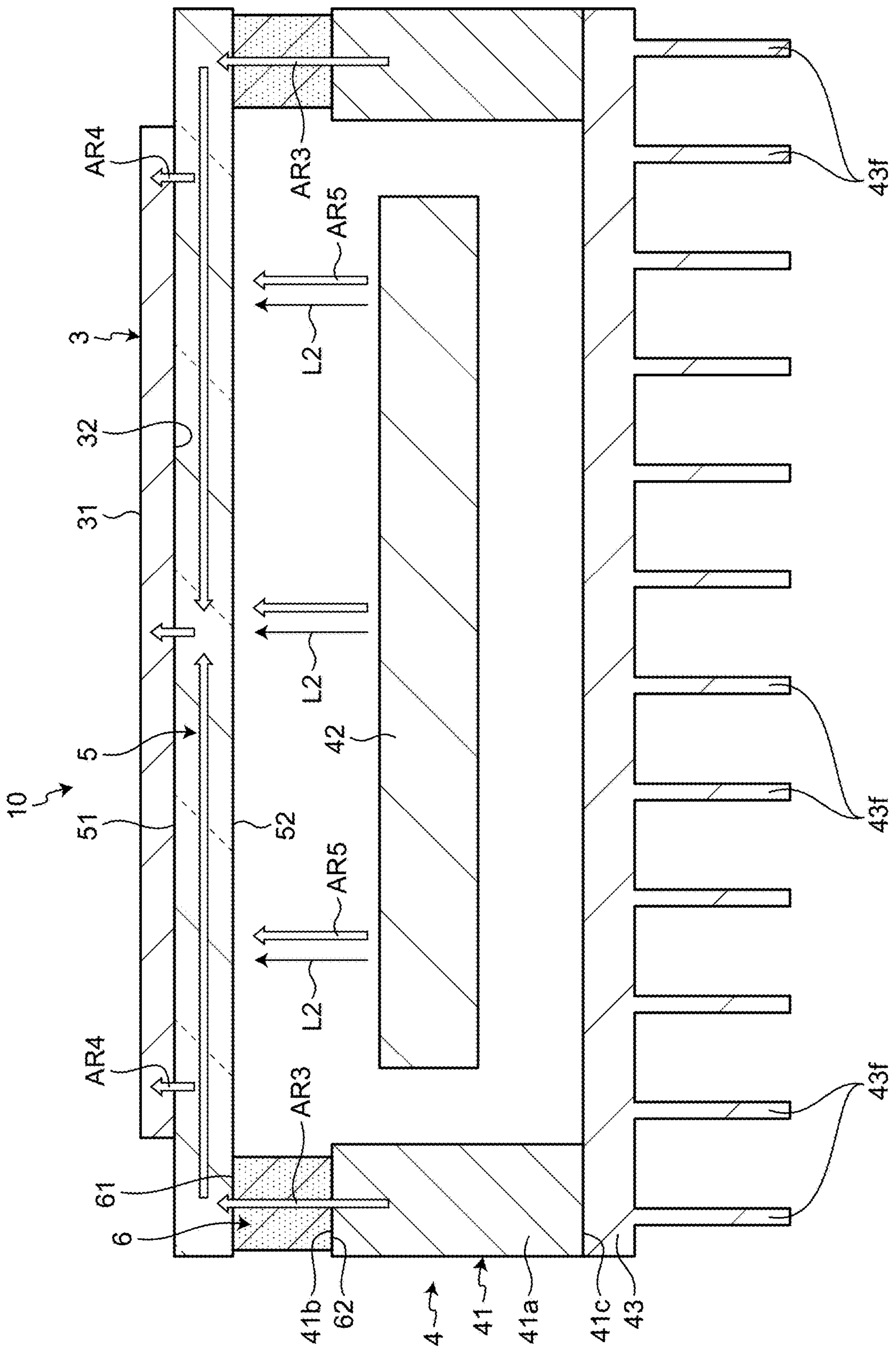
FIG. 7 is a cross-sectional view for explaining heating control according to the embodiment.

The following describes the embodiment with reference to FIG. 1 to FIG. 7. The present embodiment relates to a display device for a vehicle. FIG. 1 is an arrangement diagram of the display device for a vehicle according to the embodiment, FIG. 2 is a schematic configuration diagram of the display device for a vehicle according to the embodiment, FIG. 3 is a cross-sectional view of an image display device according to the embodiment, FIG. 4 is a plan view of the image display device according to the embodiment, FIG. 5 is a flowchart for explaining an operation of a control unit according to the embodiment, FIG. 6 is a cross-sectional view for explaining cooling control according to the embodiment, and FIG. 7 is a cross-sectional view for explaining heating control according to the embodiment.

As illustrated in FIG. 1, a display device 1 for a vehicle according to the present embodiment is a head-up display device mounted on a vehicle 100 such as an automobile. The display device 1 for a vehicle projects display light Lt of an image on a windshield 110. The windshield 110 is positioned on a front side of the vehicle with respect to an eye-point EP of the vehicle 100, and opposed to the eye-point EP in a front and rear direction X of the vehicle. The display light Lt is reflected by a reflection surface 110*a* of the windshield 110 toward the eye-point EP. A driver of the vehicle 100 can visually recognize a virtual image Vi by the display light Lt.

As illustrated in FIG. 1 and FIG. 2, the display device 1 for a vehicle includes a housing 2, an image display device 10, a control unit 7, a first mirror 11, a second mirror 12, and a cover 8. The housing 2 is arranged on the front side of the vehicle with respect to the eye-point EP, and housed in an instrument panel 120, for example. The housing 2 is an outer shell member of the display device 1 for a vehicle, and fixed to a vehicle body of the vehicle 100. The housing 2 is formed of light-shielding material, for example, formed of metal. The housing 2 has an opening 21 opposed to the windshield 110 in an upper and lower direction Z of the vehicle. The exemplified opening 21 is arranged on an upper surface of the housing 2, and positioned at a front end part of the housing 2.

The image display device 10, the control unit 7, the first mirror 11, and the second mirror 12 are arranged inside the housing 2. The image display device 10 is a device that outputs the display light Lt of an image. As illustrated in FIG. 2 and FIG. 3, the image display device 10 includes a liquid crystal display device 3, a backlight unit 4, a first heat conductive member 5, and a Peltier element 6 (second heat conductive member).

The liquid crystal display device 3 is, for example, a Thin Film Transistor-Liquid Crystal Display (TFT-LCD). The liquid crystal display device 3 includes a display surface 31 and a back surface 32. The display surface 31 is a surface that displays an image and outputs the display light Lt. The back surface 32 is a surface opposite to the display surface 31. The shape of the liquid crystal display device 3 in a plan view is rectangular, for example.

The backlight unit 4 is a device that irradiates the back surface 32 of the liquid crystal display device 3 with light. The image display device 10 generates the display light Lt by the light of the backlight unit 4. The backlight unit 4 includes a housing 41, a light source 42, and a heat sink 43. The light source 42 includes a plurality of light emitting elements arranged in an image vertical direction GV and an image horizontal direction GH, for example. The backlight unit 4 may include a lens that condenses light of the light emitting elements, and a diffusion member that diffuses the condensed light. The light source 42 is arranged to be opposed to the back surface 32 of the liquid crystal display device 3. The shape of the light source 42 in a plan view is rectangular, for example.

The housing 41 is arranged on the back surface 32 side with respect to the liquid crystal display device 3, and houses the light source 42. The housing 41 is formed of material having thermal conductivity such as metal. The housing 41 includes a side wall 41*a* that surrounds the light source 42. The side wall 41*a* according to the present embodiment has a square cylindrical shape. That is, the shape of the side wall 41*a* on a cross section orthogonal to the display light Lt is rectangular. The side wall 41*a* includes a first end face 41*b* and a second end face 41*c*. The first end face 41*b* is an end face on the liquid crystal display device 3 side of the side wall 41*a*. The second end face 41*c* is an end face on the opposite side of the first end face 41*b* of the side wall 41*a*.

The heat sink 43 is a heat radiation member, and radiates heat of the housing 41 and the light source 42 to surroundings. The exemplified heat sink 43 is arranged on the back surface side with respect to the side wall 41*a*. For example, the heat sink 43 is arranged in contact with the second end face 41*c* of the side wall 41*a*. In a case in which the housing 41 has a bottom wall, the heat sink 43 may be arranged in contact with the bottom wall. That is, the heat sink 43 is arranged to be able to conduct heat between itself and the side wall 41*a*. The heat sink 43 includes a plurality of fins 43*f* projecting toward the back surface side.

The first heat conductive member 5 is a transparent plate-shaped member having thermal conductivity. The first heat conductive member 5 is preferably colorless and transparent. The first heat conductive member 5 is formed of glass such as sapphire glass, for example. The first heat conductive member 5 is arranged between the liquid crystal display device 3 and the backlight unit 4. The first heat conductive member 5 according to the present embodiment is formed in a flat-plate shape. The shape of the first heat conductive member 5 in a plan view is rectangular, for example. The first heat conductive member 5 includes a front surface 51 and a back surface 52. The first heat conductive member 5 is arranged to bring the front surface 51 into contact with the back surface 32 of the liquid crystal display device 3. The front surface 51 is preferably in intimate contact with the entire back surface 32. The first heat conductive member 5 may be bonded to the back surface 32 of the liquid crystal display device 3.

The Peltier element 6 is a second heat conductive member that conducts heat between the first heat conductive member 5 and the housing 41. The Peltier element 6 is a thermoelectric element, and includes a first surface 61 and a second surface 62. The Peltier element 6 transfers heat between the first surface 61 and the second surface 62 in accordance with a direction of a current. The Peltier element 6 can transfer heat from the first surface 61 toward the second surface 62, and can transfer heat from the second surface 62 toward the first surface 61.

The Peltier element 6 is arranged to bring the first surface 61 into contact with the first heat conductive member 5, and bring the second surface 62 into contact with the housing 41. That is, the Peltier element 6 is sandwiched between the first heat conductive member 5 and the housing 41, and interposed between the first heat conductive member 5 and the housing 41. The first surface 61 is in contact with the back surface 52 of the first heat conductive member 5. The first surface 61 is preferably in intimate contact with the back surface 52. The second surface 62 is in contact with the first end face 41*b* of the side wall 41*a*. The second surface 62 is preferably in intimate contact with the first end face 41*b*. The Peltier element 6 according to the present embodiment can transfer heat from the first heat conductive member 5 to the housing 41, and can transfer heat from the housing 41 to the first heat conductive member 5.

As illustrated in FIG. 3 and FIG. 4, the Peltier element 6 is arranged on an outer peripheral part of the first heat conductive member 5. The Peltier element 6 is also arranged to surround the liquid crystal display device 3 when viewed in a plan view. The Peltier element 6 exemplified in FIG. 4 is arranged in a rectangular frame shape. More specifically, the Peltier element 6 includes a pair of first extending parts 63, 63 and a pair of second extending parts 64, 64.

The pair of first extending parts 63, 63 are arranged to sandwich the liquid crystal display device 3 in the image vertical direction GV when viewed in a plan view. The first extending part 63 is positioned at an end part in the image vertical direction GV of the first heat conductive member 5, and extends along the image horizontal direction GH. The pair of second extending parts 64, 64 are arranged to sandwich the liquid crystal display device 3 in the image horizontal direction GH when viewed in a plan view. The second extending part 64 is positioned at an end part in the image horizontal direction GH of the first heat conductive member 5, and extends along the image vertical direction GV. The end part of the first extending part 63 may be connected to the end part of the second extending part 64, or positioned in the vicinity of the second extending part 64.

The Peltier element 6 may be one element formed in a frame shape, or may be configured in a frame shape by combining a plurality of elements. For example, elements of the first extending part 63 may be different from elements of the second extending part 64. The first extending part 63 may be configured by arranging a plurality of elements. The second extending part 64 may be configured by arranging a plurality of elements.

As illustrated in FIG. 4, the Peltier element 6 is arranged not to overlap with the liquid crystal display device 3 in a plan view. That is, the Peltier element 6 is arranged not to block light from the light source 42 toward the liquid crystal display device 3. A slight gap may be disposed between the Peltier element 6 and the liquid crystal display device 3 when viewed in a plan view. In the image display device 10 according to the present embodiment, the first heat conductive member 5 is a size larger than the liquid crystal display device 3. The first heat conductive member 5 includes a rectangular frame-shaped part 53 surrounding the liquid crystal display device 3. The Peltier element 6 is arranged on the frame-shaped part 53, and in contact with the frame-shaped part 53. A width of the frame-shaped part 53 is determined to secure a sufficient contact area between the Peltier element 6 and the first heat conductive member 5.

The control unit 7 illustrated in FIG. 2 is configured to control the image display device 10. The control unit 7 is, for example, a computer including an arithmetic unit, a memory, a communication interface, and the like. The control unit 7 performs cooling control and heating control (described later) in accordance with a computer program stored in the memory, for example. In the image display device 10, a temperature sensor 9 is disposed to detect a temperature of the liquid crystal display device 3. The control unit 7 acquires information about the temperature of the liquid crystal display device 3 from the temperature sensor 9.

The following describes an operation of the control unit 7 with reference to FIG. 5 to FIG. 7. A flowchart illustrated in FIG. 5 is repeatedly performed when a power source of the image display device 10 is turned on, for example. At Step S10, the control unit 7 acquires temperature information. The control unit 7 acquires the information about the temperature of the liquid crystal display device 3 from the temperature sensor 9. After Step S10 is performed, the process proceeds to Step S20.

At Step S20, the control unit 7 determines whether control is required. At Step S20, necessity for temperature control using the Peltier element 6 is determined. In a case in which the temperature of the liquid crystal display device 3 is equal to or larger than a lower limit value and equal to or smaller than an upper limit value, the control unit 7 determines that temperature control is not required. On the other hand, in a case in which the temperature of the liquid crystal display device 3 is smaller than the lower limit value or exceeds the upper limit value, the control unit 7 determines that temperature control is required. As a result of the determination at Step S20, the process proceeds to Step S30 in a case in which affirmative determination is made such that control is required, and the flowchart is once ended in a case in which negative determination is made.

At Step S30, the control unit 7 determines whether the temperature of the liquid crystal display device 3 is high. In a case in which the temperature of the liquid crystal display device 3 exceeds the upper limit value, the control unit 7 determines that the temperature is high. As a result of the determination at Step S30, the process proceeds to Step S40 in a case in which affirmative determination is made, and the process proceeds to Step S50 in a case in which negative determination is made.

At Step S40, the control unit 7 performs cooling control. The cooling control is control for cooling the liquid crystal display device 3 with the Peltier element 6. As illustrated in FIG. 6, in a case in which external light L1 such as sunlight is condensed to the liquid crystal display device 3, the temperature of the liquid crystal display device 3 rises. In a high-temperature environment, the temperature of the liquid crystal display device 3 may exceed the upper limit value. In this case, the control unit 7 cools the liquid crystal display device 3 by cooling control.

The control unit 7 transfers heat from the first surface 61 to the second surface 62 by controlling a direction of a current caused to flow to the Peltier element 6. That is, the control unit 7 can cause the Peltier element 6 to absorb heat through the first surface 61 and to radiate heat through the second surface 62. Through the cooling control, as indicated by an arrow AR1 in FIG. 6, heat is conducted from the first heat conductive member 5 to the housing 41 of the backlight unit 4 via the Peltier element 6. The heat of the housing 41 is radiated mainly from the heat sink 43. When the first heat conductive member 5 is cooled, as indicated by an arrow AR2, the heat of the liquid crystal display device 3 is released to the first heat conductive member 5.

The Peltier element 6 can efficiently cool the first heat conductive member 5 by causing the temperature of the first surface 61 to be lower than a temperature of a peripheral environment. Thus, the image display device 10 according to the present embodiment can lower the temperature of the liquid crystal display device 3 to be equal to or smaller than the upper limit value by cooling control.

When the temperature of the liquid crystal display device 3 is lowered to an appropriate temperature, the control unit 7 ends the cooling control. A threshold of the temperature at the time of ending the cooling control is, for example, a value on a lower temperature side than the upper limit value described above. When Step S40 is performed, this control procedure ends.

At Step S50, the control unit 7 performs heating control. The heating control is control for heating the liquid crystal display device 3 with the Peltier element 6. The heating control is performed in a case in which the temperature of the liquid crystal display device 3 is low such as when it is cold.

The control unit 7 transfers heat from the second surface 62 to the first surface 61 by controlling the direction of the current caused to flow to the Peltier element 6. That is, the control unit 7 can cause the Peltier element 6 to absorb heat through the second surface 62 and to heat the first heat conductive member 5 with the first surface 61. Through the heating control, as indicated by an arrow AR3 in FIG. 7, heat is conducted from the housing 41 to the first heat conductive member 5 via the Peltier element 6. The heat conducted to the first heat conductive member 5 heats the liquid crystal display device 3 as indicated by an arrow AR4.

The control unit 7 turns on the light source 42 in the heating control. The light source 42 irradiates the liquid crystal display device 3 with light L2. Heat of the light source 42 heats the first heat conductive member 5 and the liquid crystal display device 3 from the back surface side as indicated by an arrow AR5. Furthermore, the heat of the light source 42 is conducted from the housing 41 to the first heat conductive member 5 via the Peltier element 6.

In the heating control according to the present embodiment, the liquid crystal display device 3 is heated by the Peltier element 6 and the light source 42. The Peltier element 6 arranged in a frame shape with respect to the liquid crystal display device 3 can heat edge parts of the liquid crystal display device 3. Accordingly, the entire liquid crystal display device 3 can be quickly heated by the heating control according to the present embodiment.

When the temperature of the liquid crystal display device 3 rises to an appropriate temperature, the control unit 7 ends the heating control. A threshold of the temperature at the time of ending the heating control is, for example, a value on a higher temperature side than the lower limit value described above. When Step S50 is performed, this control procedure ends.

As described above, the display device 1 for a vehicle according to the present embodiment can selectively perform the cooling control and the heating control based on the temperature of the liquid crystal display device 3. Thus, the display device 1 for a vehicle according to the present embodiment can appropriately control the temperature of the liquid crystal display device 3.

As described above, the display device 1 for a vehicle according to the present embodiment includes the housing 41, the liquid crystal display device 3, the transparent plate-shaped first heat conductive member 5, and the Peltier element 6. The exemplified first heat conductive member 5 is arranged in contact with the back surface 32 of the liquid crystal display device 3. The Peltier element 6 is a second heat conductive member that conducts heat between the first heat conductive member 5 and the housing 41. The display device 1 for a vehicle according to the present embodiment can conduct heat between the first heat conductive member 5 and the housing 41 by the second heat conductive member. Accordingly, the temperature of the liquid crystal display device 3 can be appropriately controlled.

The display device 1 for a vehicle according to the present embodiment includes the control unit 7, which controls the Peltier element 6. The Peltier element 6 as the second heat conductive member includes the first surface 61 and the second surface 62, and is arranged to bring the first surface 61 into contact with the first heat conductive member 5 and bring the second surface 62 into contact with the housing 41. The control unit 7 selectively performs cooling control for cooling the liquid crystal display device 3 with the Peltier element 6 and heating control for heating the liquid crystal display device 3 with the Peltier element 6 based on the temperature of the liquid crystal display device 3. Thus, the display device 1 for a vehicle can appropriately control the temperature of the liquid crystal display device 3.

The display device 1 for a vehicle according to the present embodiment includes the backlight unit 4, which irradiates the back surface 32 of the liquid crystal display device 3 with light. The backlight unit 4 includes the housing 41 and the light source 42 housed in the housing 41. The first heat conductive member 5 is arranged in contact with the back surface 32 of the liquid crystal display device 3. The Peltier element 6 is arranged in a frame shape surrounding the liquid crystal display device 3 and is sandwiched between the first heat conductive member 5 and the housing 41. Thus, the Peltier element 6 according to the present embodiment can efficiently cool or heat the liquid crystal display device 3.

In the heating control according to the present embodiment, the control unit 7 turns on the light source 42 and causes the Peltier element 6 to absorb heat through the second surface 62 and to heat the first heat conductive member 5 with the first surface 61. The image display device 10 according to the present embodiment can heat the liquid crystal display device 3 by conducting heat of the light source 42 to the liquid crystal display device 3 via the housing 41, the Peltier element 6, and the first heat conductive member 5.

The following examines a configuration not including the Peltier element 6 as a comparative example for the present embodiment. In the comparative example, cooling of the liquid crystal display device 3 is performed by heat absorption by the first heat conductive member 5 or heat transfer from the first heat conductive member 5 to the housing 41 and the like. In the configuration of the comparative example, heat capacity of the first heat conductive member 5 is set based on the amount of heat received by the liquid crystal display device 3. Due to this, the size of the first heat conductive member 5 needs to be adjusted for each product. Considering the heat capacity required for the first heat conductive member 5, there is a limit to downsizing of the first heat conductive member 5, and the image display device tends to be upsized.

On the other hand, the display device 1 for a vehicle according to the present embodiment can cool the first heat conductive member 5 with the Peltier element 6, so that it is possible to reduce the thickness of the first heat conductive member 5 or downsize the first heat conductive member 5.

In the comparative example, in a case in which the temperature of the liquid crystal display device 3 exceeds the upper limit value in a high-temperature environment, the light source 42 needs to be attenuated or turned off. On the other hand, the display device 1 for a vehicle according to the present embodiment can control the temperature of the liquid crystal display device 3 to be equal to or smaller than the upper limit value by cooling control. The light source 42 does not need to be attenuated or turned off, so that visibility of the virtual image Vi is improved.

The control unit 7 may acquire the temperature information of the liquid crystal display device 3 from a control device and the like of the vehicle 100. By way of example, the control unit 7 may estimate the temperature of the liquid crystal display device 3 based on information acquired from the temperature sensor or an illuminometer of the vehicle 100.

First Modification of Embodiment

Figure 8:
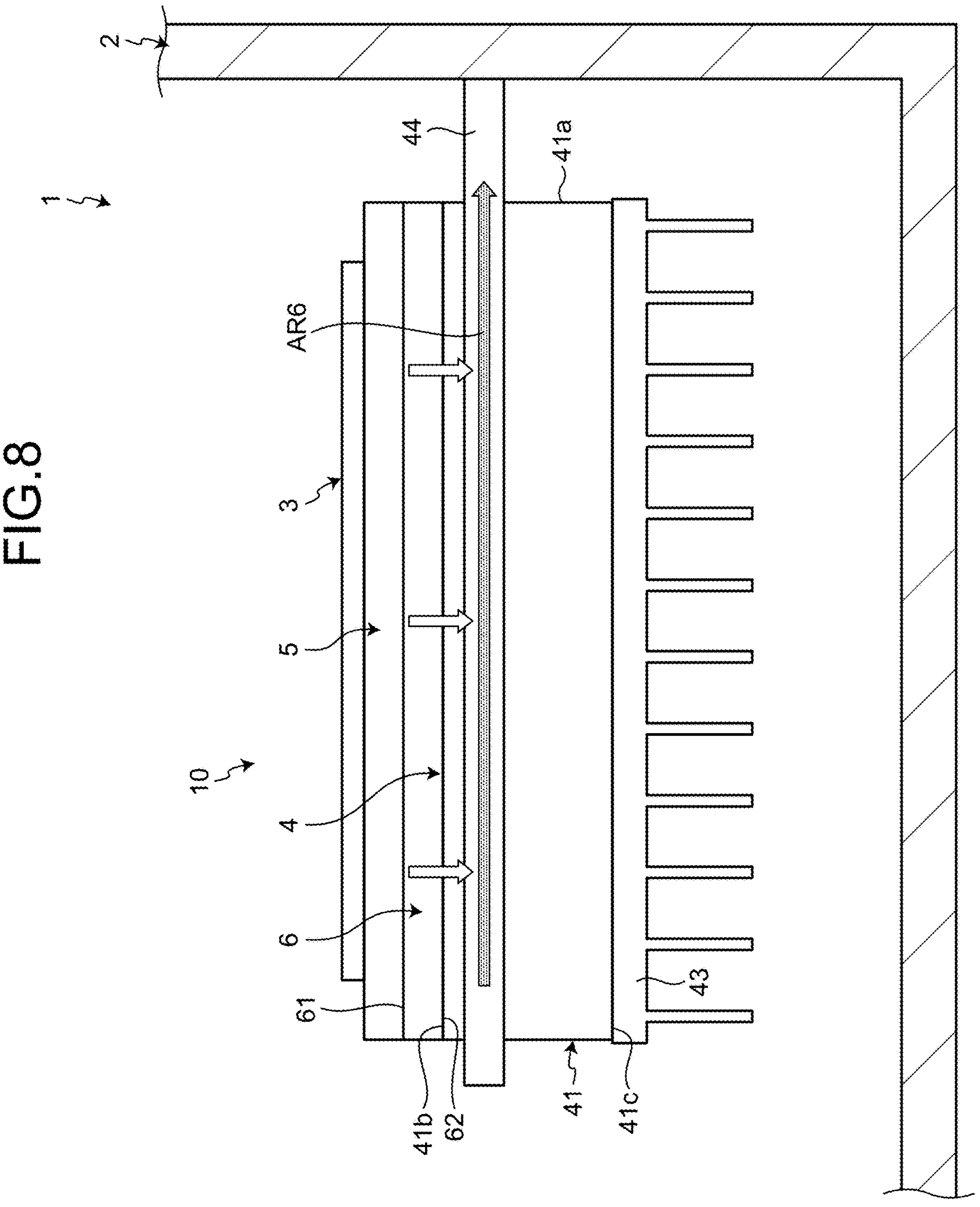
FIG. 8 is a diagram illustrating an image display device according to a first modification of the embodiment.

The following describes a first modification of the embodiment. FIG. 8 is a diagram illustrating the image display device according to the first modification of the embodiment. The image display device 10 according to the first modification is different from the embodiment described above in that a heat transfer part 44 is included, for example. As illustrated in FIG. 8, the heat transfer part 44 conducts heat between the side wall 41*a* of the backlight unit 4 and the housing 2 of the display device 1 for a vehicle. The heat transfer part 44 is formed of material having thermal conductivity such as metal. The heat transfer part 44 may be part of the housing 41. The heat transfer part 44 may be a fixing member for fixing the housing 41 of the backlight unit 4 to the housing 2.

The heat transfer part 44 is arranged between the first end face 41*b* and the second end face 41*c* of the side wall 41*a*. The heat transfer part 44 may be arranged at an end part on the first end face 41*b* side of the side wall 41*a*. The heat transfer part 44 may be arranged in a flange shape surrounding the side wall 41*a*.

In a case in which cooling control is performed by the Peltier element 6, as indicated by an arrow AR6 in FIG. 8, heat is released from the side wall 41*a* to the housing 2 via the heat transfer part 44. The heat transfer part 44 can improve cooling capacity for the liquid crystal display device 3.

Second Modification of Embodiment

Figure 9:
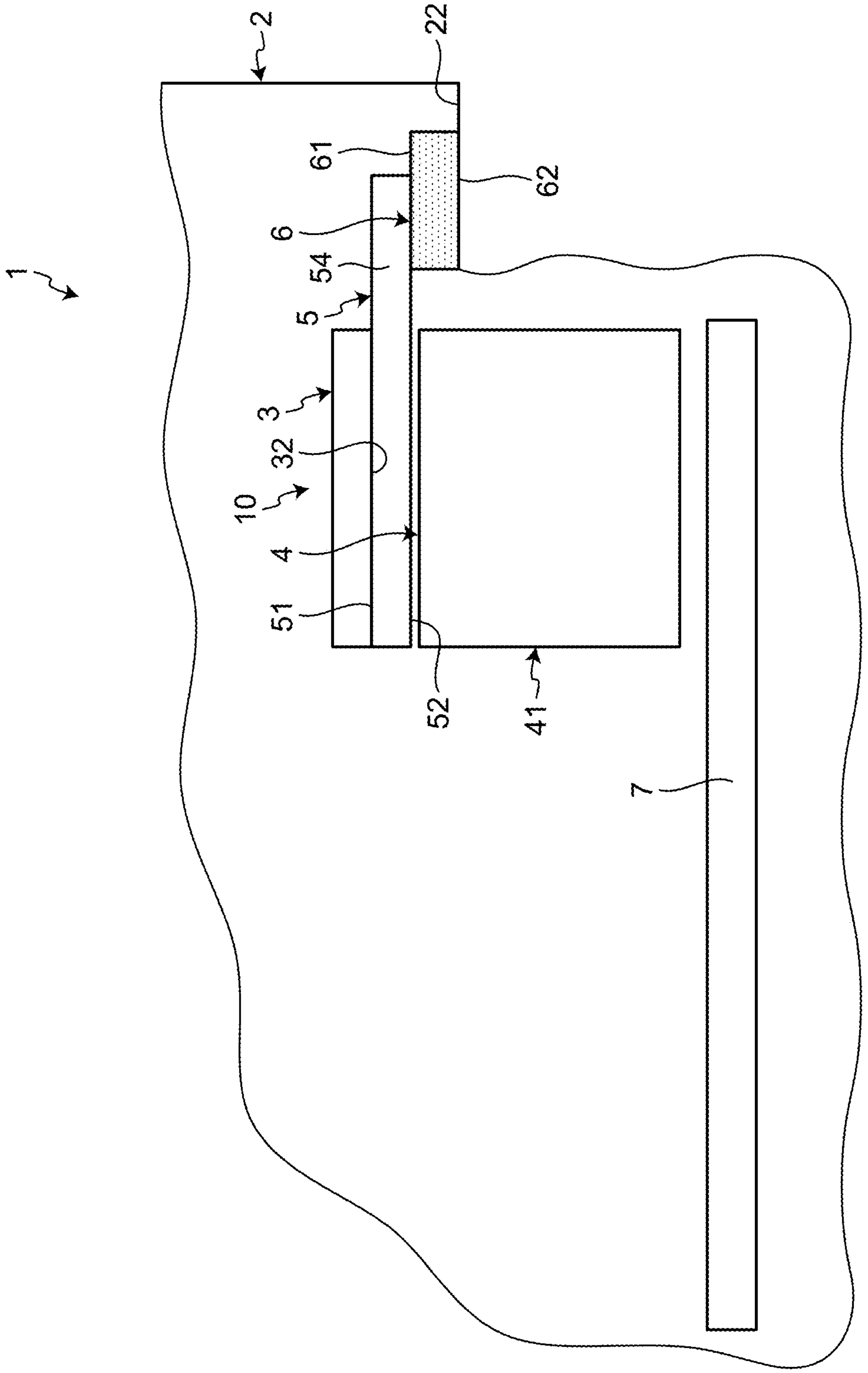
FIG. 9 is a diagram illustrating a display device for a vehicle according to a second modification of the embodiment.
Figure 10:
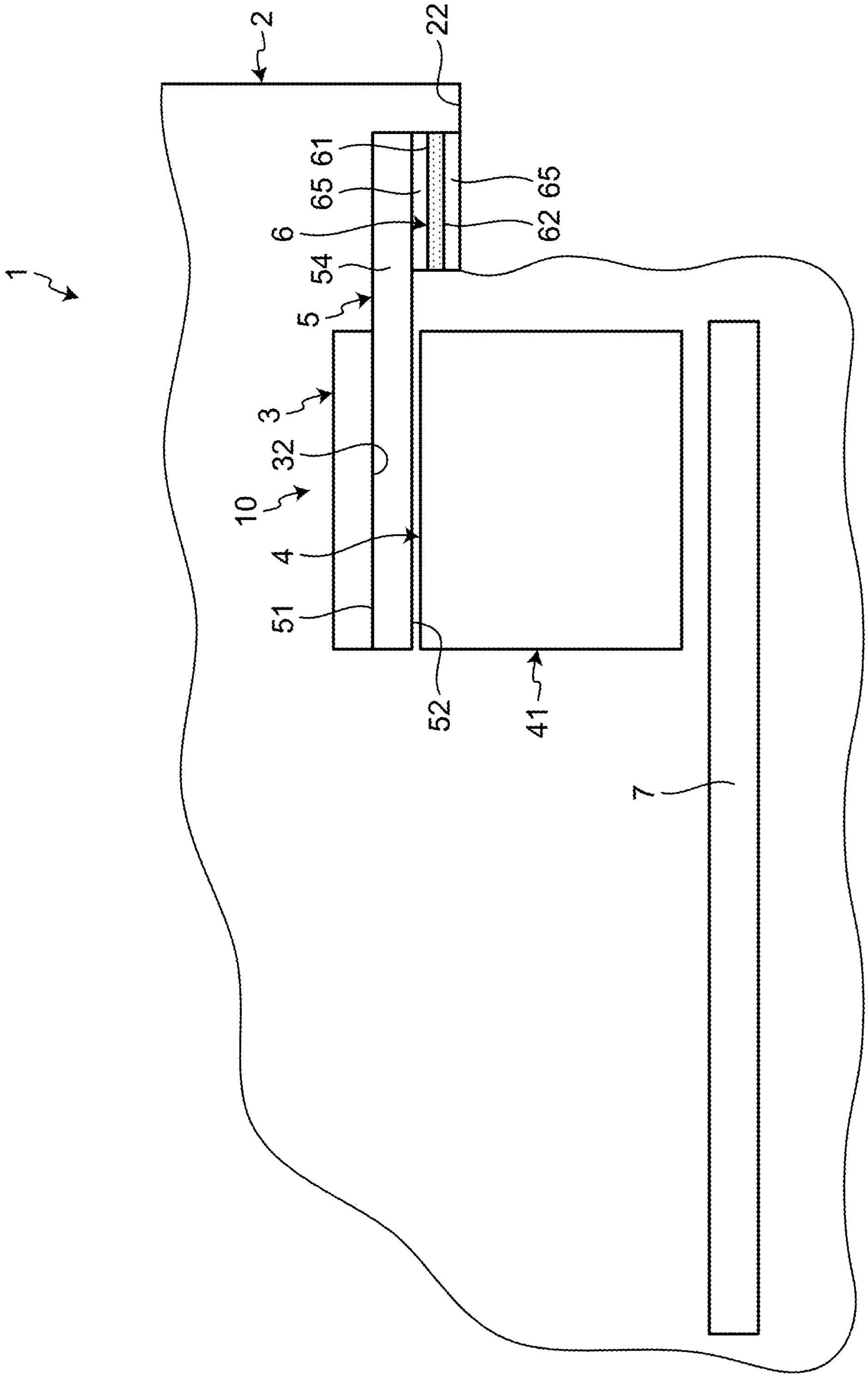
FIG. 10 is a diagram illustrating the display device for a vehicle according to the second modification of the embodiment.

The following describes a second modification of the embodiment. FIG. 9 and FIG. 10 are diagrams illustrating the display device for a vehicle according to the second modification of the embodiment. The second modification of the embodiment is different from the embodiment described above in that the Peltier element 6 is interposed between the first heat conductive member 5 and the housing 2, for example.

As illustrated in FIG. 9, the first heat conductive member 5 includes a projecting part 54 projecting toward a lateral side with respect to the liquid crystal display device 3. The projecting part 54 projects toward a side wall of the housing 2. The Peltier element 6 is arranged to bring the first surface 61 into contact with the first heat conductive member 5, and bring the second surface 62 into contact with an inner wall surface 22 of the housing 2. The second surface 62 is in contact with a surface facing upward of the inner wall surface 22, for example. The Peltier element 6 is sandwiched between the back surface 52 of the first heat conductive member 5 and the inner wall surface 22 of the housing 2.

The Peltier element 6 according to the second modification of the embodiment can release the heat of the first heat conductive member 5 to the housing 2. A physique of the housing 2 is larger than that of the housing 41 of the backlight unit 4. Thus, the display device 1 for a vehicle according to the second modification of the embodiment can appropriately control the temperature of the liquid crystal display device 3. In the configuration according to the second modification, it is possible to easily widen a contact area between the Peltier element 6 and the first heat conductive member 5, and a contact area between the Peltier element 6 and the housing 2. For example, the contact area described above can be expanded without being limited by the size of the housing 41.

The control unit 7 can perform the cooling control and the heating control similarly to the control unit 7 in the embodiment described above. The control unit 7 may turn on the light source 42 of the backlight unit 4 at the time of performing the heating control by the Peltier element 6.

As illustrated in FIG. 10, heat conduction sheets 65 may be interposed between the first heat conductive member 5 and the Peltier element 6, and between the housing 2 and the Peltier element 6. The heat conduction sheet 65 is a sheet member having high thermal conductivity. The thermal conductivity of the heat conduction sheet 65 is preferably larger than the thermal conductivity of the first heat conductive member 5. The heat conduction sheet 65 may be a sheet having flexibility and adhesion. The heat conduction sheet 65 may be formed of resin such as silicon, for example. Instead of the heat conduction sheet 65, a bonding agent having thermal conductivity may be used.

In the second modification of the embodiment, the position of the first heat conductive member 5 with respect to the liquid crystal display device 3 is not limited to the back surface 32 side. The first heat conductive member 5 may be arranged on the display surface 31 side of the liquid crystal display device 3.

Third Modification of Embodiment

Figure 11:
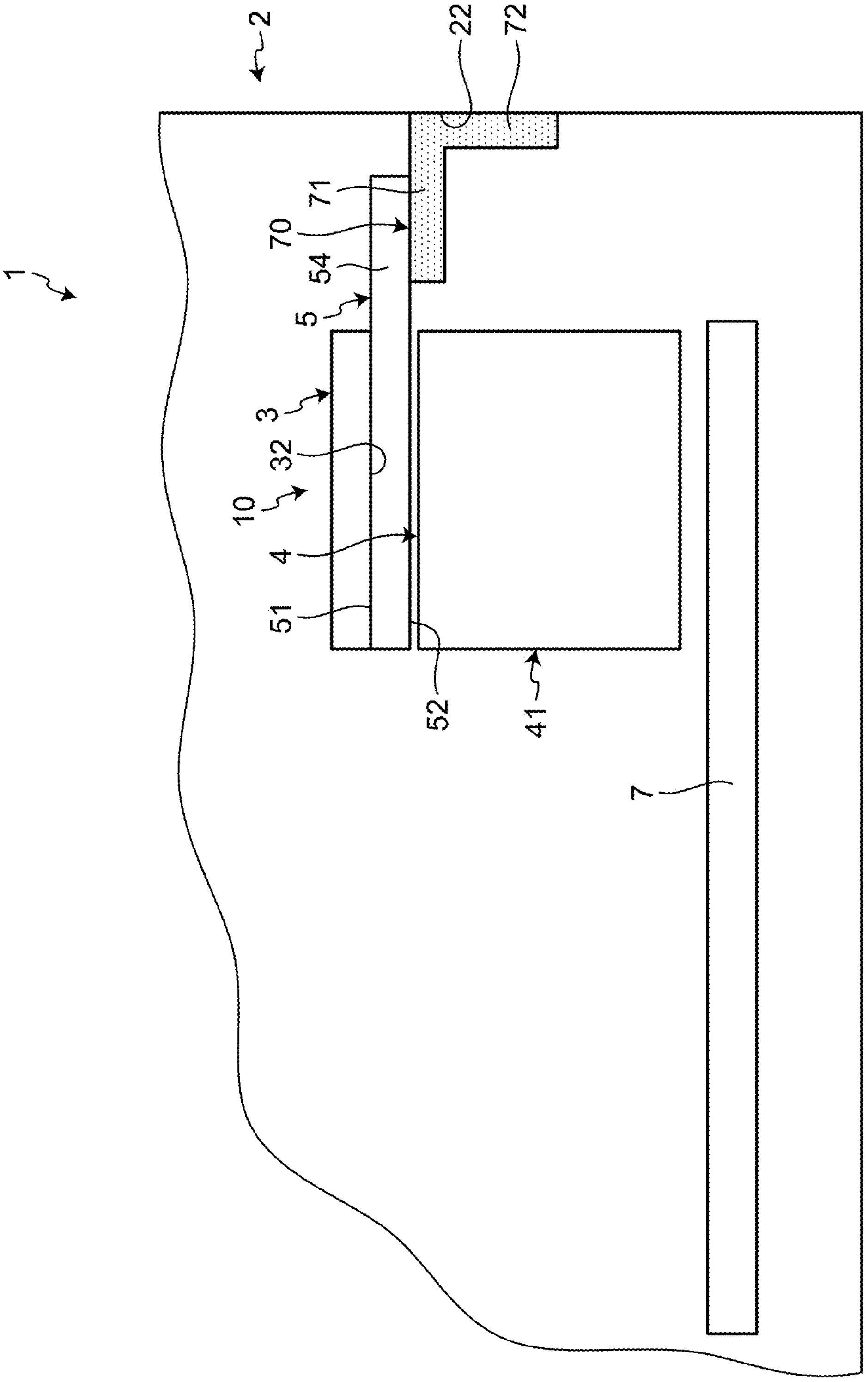
FIG. 11 is a diagram illustrating a display device for a vehicle according to a third modification of the embodiment.
Figure 12:
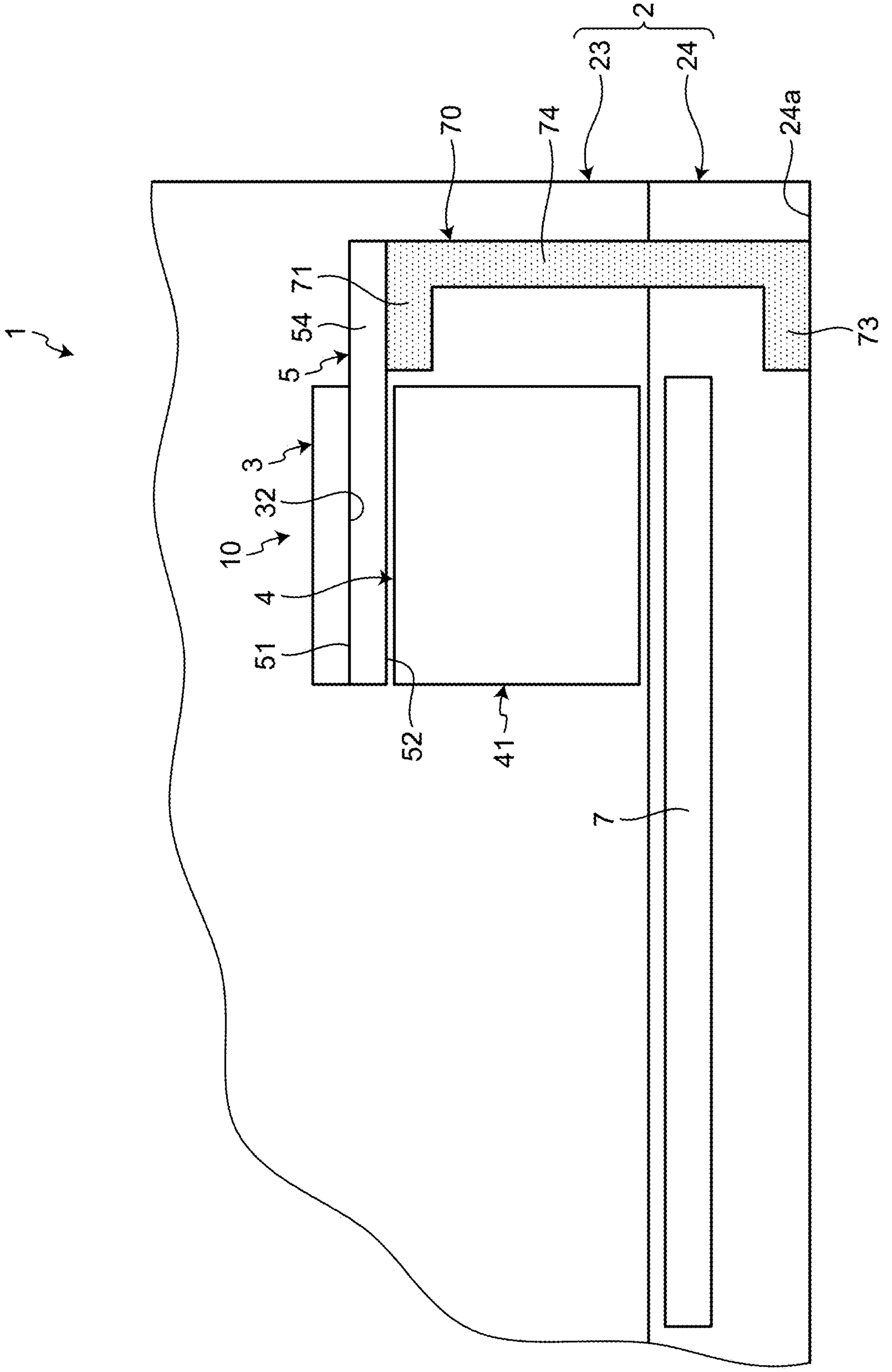
FIG. 12 is a diagram illustrating the display device for a vehicle according to the third modification of the embodiment.
Figure 13:
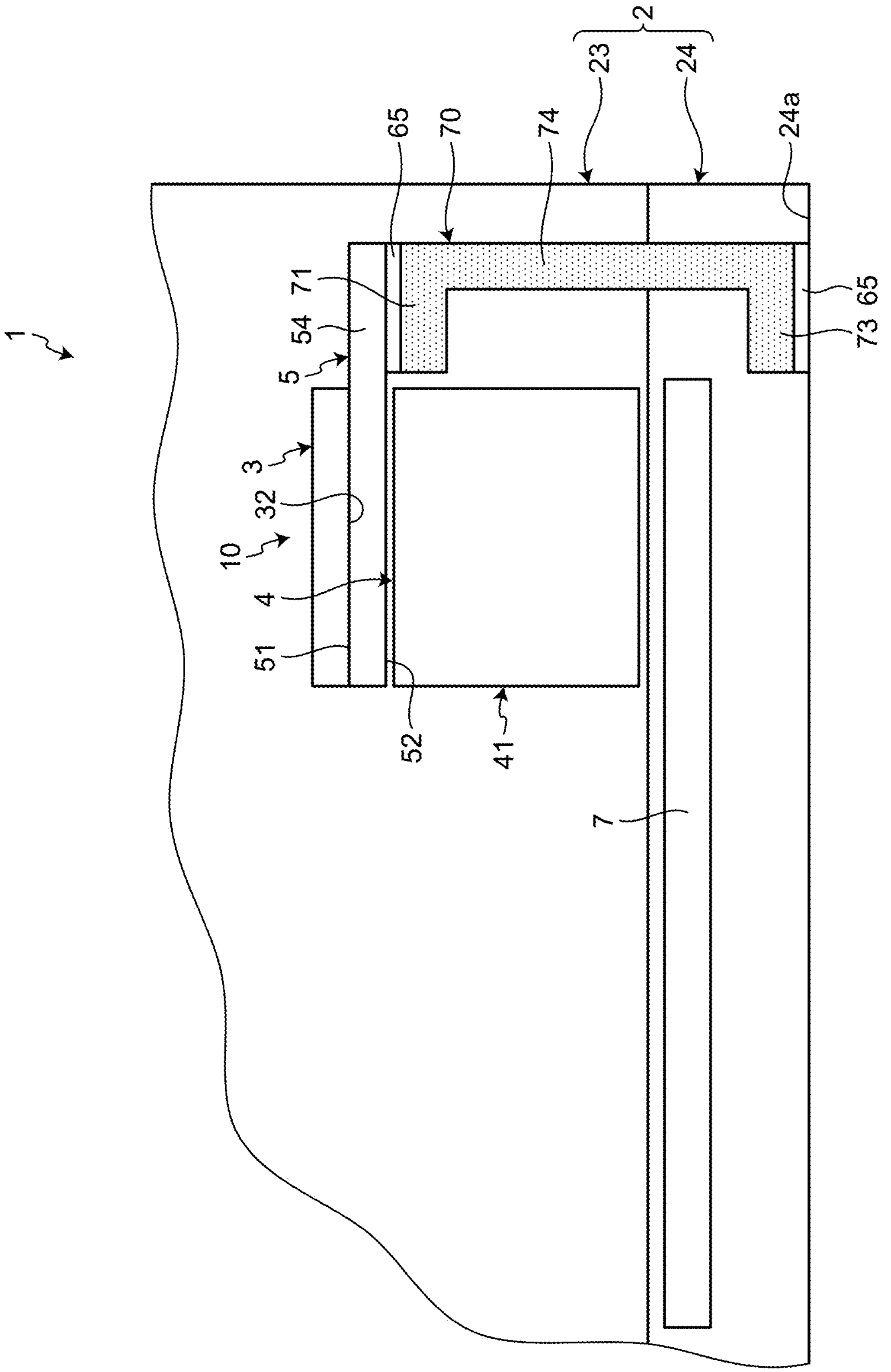
FIG. 13 is a diagram illustrating the display device for a vehicle according to the third modification of the embodiment.

The following describes a third modification of the embodiment. FIG. 11 to FIG. 13 are diagrams illustrating the display device for a vehicle according to the third modification of the embodiment. The third modification of the embodiment is different from the embodiment described above in that a metal member having high thermal conductivity is provided as a second heat conductive member, for example.

A second heat conductive member 70 illustrated in FIG. 11 has higher thermal conductivity than that of the first heat conductive member 5. The second heat conductive member 70 is formed of metal or alloy such as copper or aluminum, for example. The shape of the second heat conductive member 70 is a plate shape or a rod shape, for example. The second heat conductive member 70 exemplified in FIG. 11 is bent to form a substantially L-shape. The second heat conductive member 70 includes a first contact part 71 and a second contact part 72. The second heat conductive member 70 is bent between the first contact part 71 and the second contact part 72. The first contact part 71 is in contact with the first heat conductive member 5, and bonded to the back surface 52 of the first heat conductive member 5, for example. The second contact part 72 is in contact with the inner wall surface 22 of the housing 2. The second contact part 72 may be bonded to the housing 2, or may be fixed to the housing 2 by a fastening member and the like.

The housing 2 illustrated in FIG. 12 includes a main body 23 and a cover 24. The main body 23 has a cylindrical shape, and houses the image display device 10. The cover 24 blocks an opening of the main body 23. The exemplified main body 23 is formed of resin, and the cover 24 is formed of metal. The thermal conductivity of the cover 24 is larger than the thermal conductivity of the main body 23.

The second heat conductive member 70 illustrated in FIG. 12 is bent to form a substantially U-shape. More specifically, the second heat conductive member 70 includes the first contact part 71, a second contact part 73, and an intermediate part 74. The shape of the exemplified intermediate part 74 is a linear shape along an axial direction of the main body 23. The second heat conductive member 70 is bent so that the first contact part 71 and the second contact part 73 are orthogonal to the intermediate part 74. The first contact part 71 is in contact with the first heat conductive member 5, and bonded to the back surface 52, for example. The second contact part 73 is in contact with the cover 24 of the housing 2. The second contact part 73 may be bonded to the cover 24, or may be fixed to the cover 24 by a fastening member and the like.

As illustrated in FIG. 13, the heat conduction sheets 65 may be interposed between the first heat conductive member 5 and the second heat conductive member 70, and between the housing 2 and the second heat conductive member 70. Instead of the heat conduction sheet 65, a bonding agent having thermal conductivity may be used.

The shape of the second heat conductive member 70 is not limited to the shapes exemplified in FIG. 11 to FIG. 13. For example, instead of the shape illustrated in FIG. 12, the second heat conductive member 70 may be bent to form a substantially Z-shape. In other words, the first contact part 71 and the second contact part 73 may be bent toward opposite sides with respect to the intermediate part 74. The shape of the second heat conductive member 70 is optional, and designed so that heat can be appropriately conducted between the first heat conductive member 5 and the housing 2.

In the third modification of the embodiment, the position of the first heat conductive member 5 with respect to the liquid crystal display device 3 is not limited to the back surface 32 side. The first heat conductive member 5 may be arranged on the display surface 31 side of the liquid crystal display device 3.

Pieces of the content disclosed in the embodiment and modifications described above can be appropriately combined to be performed.

The display device for a vehicle according to the present invention includes a second heat conductive member that conducts heat between a first heat conductive member and a housing. Thus, the display device for a vehicle according to the present invention exhibits an effect of appropriately controlling the temperature of the liquid crystal display device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device for a vehicle comprising:

a first housing fixed to a vehicle body;

a liquid crystal display device housed in the first housing;

a backlight unit that is housed in the first housing, and irradiates a back surface of the liquid crystal display device with light;

a transparent plate-shaped first heat conductive member that is arranged in contact with any of a display surface and the back surface of the liquid crystal display device;

a second heat conductive member that conducts heat between the first heat conductive member and the first housing; and the backlight unit includes a second housing, a light source housed in the second housing, and a heat sink that radiates heat of the second housing and the light source, and the second heat conductive member is a Peltier element that is sandwiched between the first housing and the first heat conductive member.

2. The display device for a vehicle according to claim 1, further comprising:

a control unit that controls the second heat conductive member, wherein the second heat conductive member is the Peltier element including a first surface and a second surface, and arranged to bring the first surface into contact with the first heat conductive member and bring the second surface into contact with the first housing, and the control unit selectively performs cooling control for cooling the liquid crystal display device with the Peltier element and heating control for heating the liquid crystal display device with the Peltier element based on a temperature of the liquid crystal display device.

3. The display device for a vehicle according to claim 2, wherein, in the heating control, the control unit turns on the light source and causes the Peltier element to absorb heat through the second surface and to heat the first heat conductive member with the first surface.

* * * * *